(12) United States Patent
Kitsu et al.

(10) Patent No.: US 12,304,608 B2
(45) Date of Patent: May 20, 2025

(54) OUTBOARD MOTOR

(71) Applicant: HONDA MOTOR CO., LTD., Tokyo (JP)

(72) Inventors: Kunihiro Kitsu, Wako (JP); Kazuyoshi Sato, Wako (JP); Haruhiko Komatsu, Wako (JP); Masami Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 514 days.

(21) Appl. No.: 17/866,610

(22) Filed: Jul. 18, 2022

(65) Prior Publication Data

US 2023/0029328 A1 Jan. 26, 2023

(30) Foreign Application Priority Data

Jul. 26, 2021 (JP) ................................ 2021-121898

(51) Int. Cl.
*B63H 20/32* (2006.01)
*B63H 20/02* (2006.01)
*F16B 5/02* (2006.01)

(52) U.S. Cl.
CPC ............. *B63H 20/32* (2013.01); *B63H 20/02* (2013.01); *F16B 5/02* (2013.01)

(58) Field of Classification Search
CPC ............ B63H 20/32; B63H 20/02; F16B 5/02
See application file for complete search history.

(56) References Cited

U.S. PATENT DOCUMENTS

| 6,190,219 | B1 * | 2/2001 | Meier | ................... | F02B 61/045 |
| | | | | | 440/77 |
| 2007/0210531 | A1 | 9/2007 | Kitsu et al. | | |
| 2007/0251490 | A1 * | 11/2007 | Yazaki | ................... | F02F 7/0065 |
| | | | | | 123/198 E |
| 2015/0219134 | A1 * | 8/2015 | Yamaguchi | ............... | F16B 5/02 |
| | | | | | 403/11 |

FOREIGN PATENT DOCUMENTS

JP 2007-237849 9/2007

* cited by examiner

*Primary Examiner* — Stephen P Avila
(74) *Attorney, Agent, or Firm* — Amin, Turocy & Watson, LLP

(57) ABSTRACT

An engine cover of an outboard motor includes an upper cover and a lower cover that are vertically separable. A fixing belt capable of fixing the upper cover and the lower cover to each other is attached to the rear end of the engine cover. The upper cover includes a belt holding portion that holds the fixing belt. The belt holding portion includes a holding frame that forms a belt insertion hole. A head portion of the fixing belt includes a pair of contact portions that come into contact with upper surfaces of a pair of first frame portions of the holding frame.

10 Claims, 10 Drawing Sheets

US 12,304,608 B2

OUTBOARD MOTOR

CROSS-REFERENCE TO RELATED APPLICATIONS

This application is based upon and claims the benefit of priority from Japanese Patent Application No. 2021-121898 filed on Jul. 26, 2021, the contents of which are incorporated herein by reference.

BACKGROUND OF THE INVENTION

Field of the Invention

The present invention relates to an outboard motor mounted on a vessel.

Description of the Related Art

The present applicant has proposed an outboard motor including an engine cover that covers an engine (see JP 2007-237849 A). The engine cover of the outboard motor includes an upper cover and a lower cover that are vertically separable. A main portion of the engine is covered by the upper cover. A lower portion of the engine is covered by the lower cover. A seal member is disposed between a lower end portion of the upper cover and an upper end portion of the lower cover. A locking mechanism is provided at each of a front end and a rear end of the engine cover.

In the engine cover, the lower end portion of the upper cover and the upper end portion of the lower cover are aligned with each other. Thus, the groove portion of the seal member is fitted to the lower end portion of the upper cover. A seal lip portion of the seal member is disposed to face the upper end portion of the lower cover.

Then, after the lower end portion of the upper cover and the upper end portion of the lower cover are aligned with each other with the seal member interposed therebetween, the locking mechanism is operated. As the lock mechanism is operated, the upper cover is pushed down and moves toward the lower cover. As a result, the sealing member is pressed between the upper cover and the lower cover, and the upper cover and the lower cover are vertically connected to each other.

In the outboard motor described above, simplification of the structure and reduction of the manufacturing cost are required.

SUMMARY OF THE INVENTION

According to an aspect of the present invention, provided is an outboard motor rotatably mounted on a stern of a vessel via a clamping mechanism, the outboard motor comprising: an engine cover including an upper cover and a lower cover that are vertically separable, the engine cover housing therein an engine; and a screw disposed so as to extend rearward and rotated by a driving force from the engine, wherein the upper cover and the lower cover are connected to each other in an up-down direction at a front end of the engine cover, a fixing belt configured to fix the upper cover and the lower cover to each other is attached to a rear end of the engine cover, the upper cover includes a belt holding portion configured to hold the fixing belt, the belt holding portion includes a base wall, and a holding frame that forms a belt insertion hole between the base wall and the holding frame, the holding frame includes a pair of first frame portions protruding from the base wall, and a second frame portion spaced apart from the base wall and configured to connect the pair of first frame portions to each other, the fixing belt includes a head portion held by the belt holding portion, and a belt portion that extends from the head portion, is inserted through the belt insertion hole of the belt holding portion to extend downward, and is engaged with a locking portion of the lower cover, and the head portion includes a pair of contact portions configured to come into contact with upper surfaces of the pair of first frame portions of the holding frame.

Specifically, the engine cover of the outboard motor includes the upper cover and the lower cover that are vertically separable, and the upper cover and the lower cover are connected to each other in the up-down direction at the front end of the engine cover. The fixing belt capable of fixing the upper cover and the lower cover to each other is attached to the rear end of the engine cover. When the upper cover and the lower cover are attached and detached, the fixing belt, the head portion of which is held by the belt holding portion and the belt portion of which is engaged with the locking portion, is detached from the locking portion. As a result, the upper cover and the lower cover can be easily released from being fixed to each other. Further, by engaging the belt portion of the fixing belt with the locking portion, the upper cover and the lower cover can be easily fixed to each other by the fixing belt.

As a result, the structure of the outboard motor including the engine cover can be simplified as compared with the conventional outboard motor. Further, the outboard motor can be miniaturized as compared with the conventional outboard motor. By simplifying the structure of the outboard motor, the manufacturing cost thereof can be reduced.

The above and other objects features and advantages of the present invention will become more apparent from the following description when taken in conjunction with the accompanying drawings in which a preferred embodiment of the present invention is shown by way of illustrative example.

DESCRIPTION OF THE INVENTION

An outboard motor 10 is mounted on a stern (rear end) 121 of a vessel 12 when used as a power source of a small vessel, for example. The outboard motor 10 is driven by an operation of an operator (not shown) to propel the vessel 12.

Figure 1:
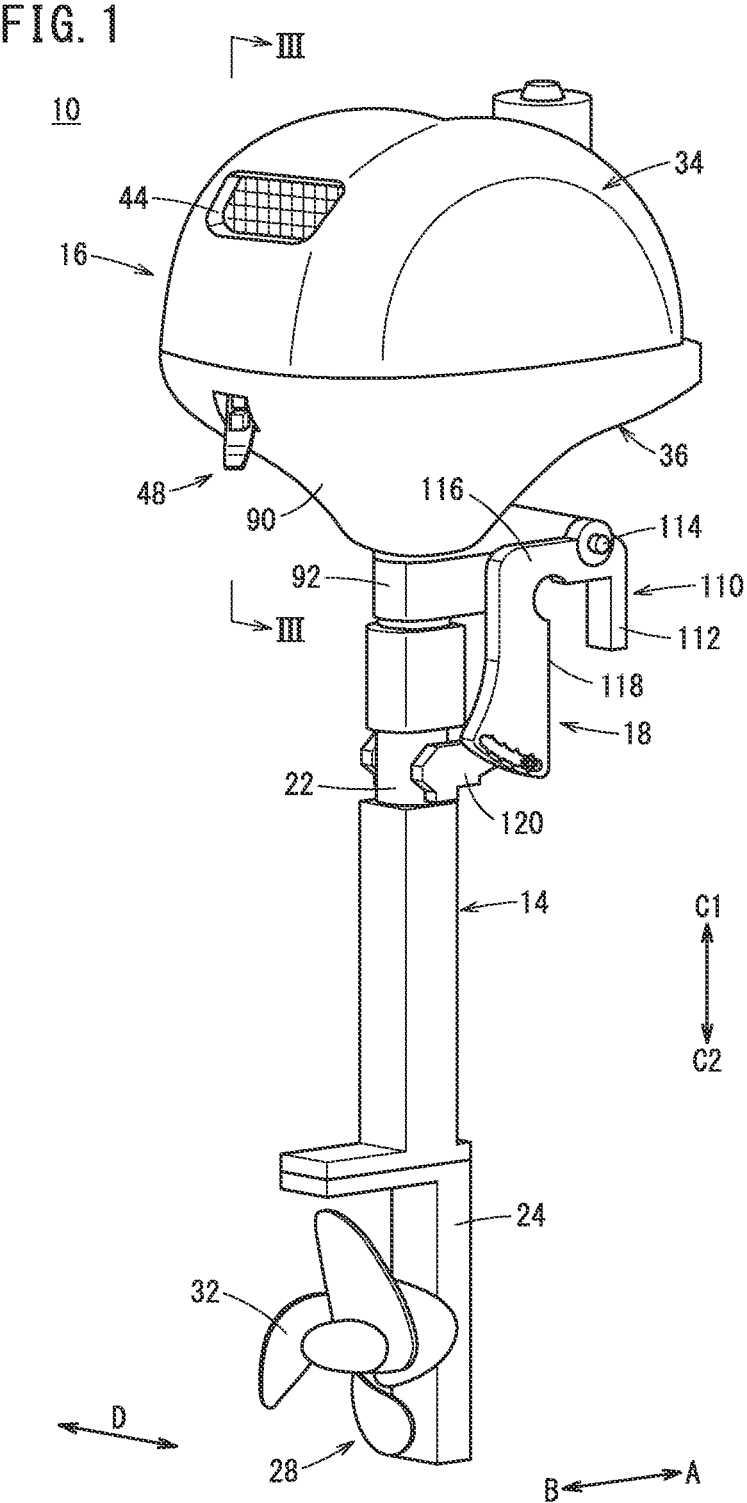
FIG. 1 is an external perspective view of an outboard motor according to an embodiment of the present invention.
Figure 2:
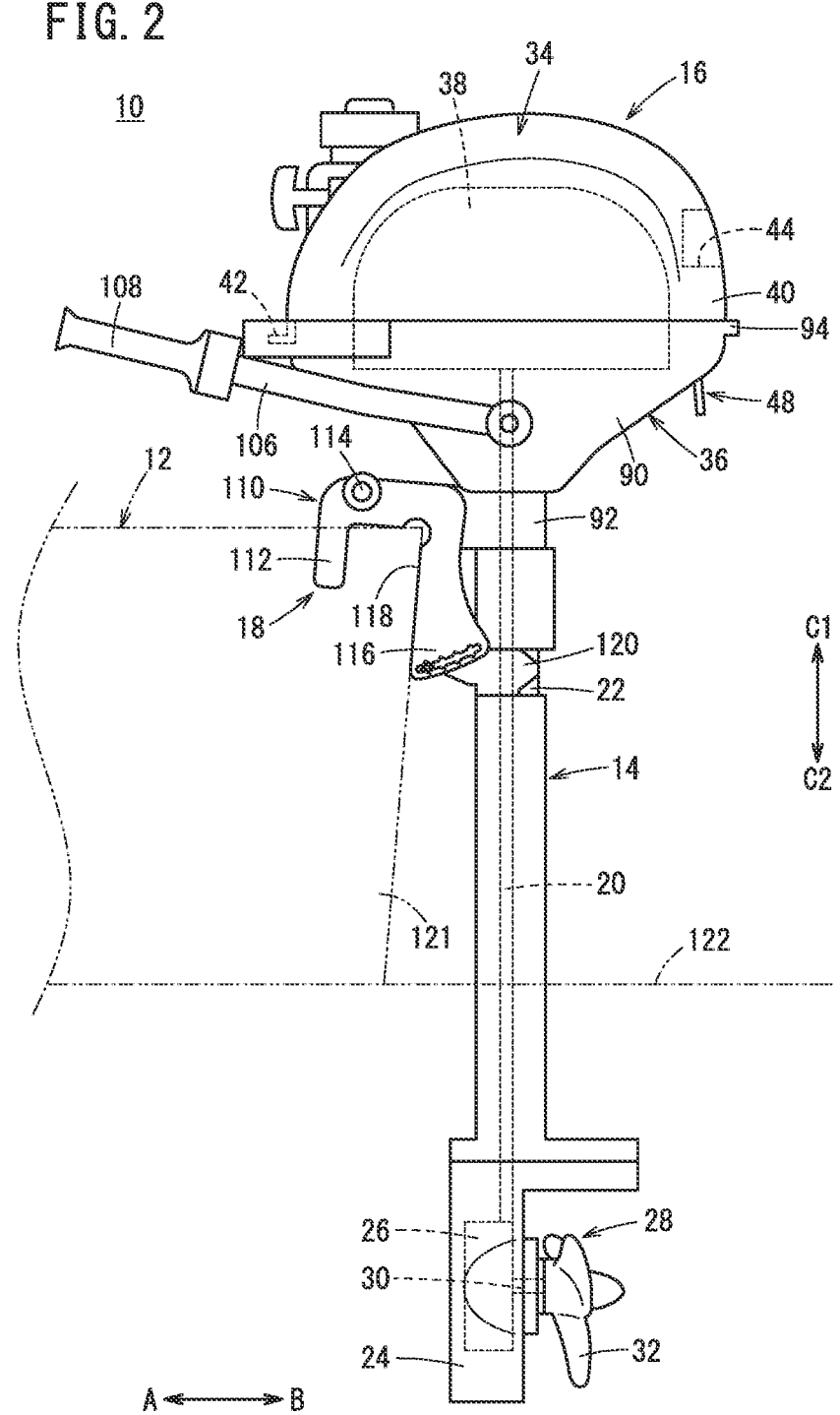
FIG. 2 is an overall side view of the outboard motor mounted on a stern of a vessel.

As shown in FIGS. 1 and 2, the outboard motor 10 includes a casing 14, an engine cover 16, and a clamping mechanism 18. The outboard motor 10 is fixed to the center of the stern 121 of the vessel 12 by the clamping mechanism 18 as will be described later. In the following description, a direction in which the outboard motor 10 is fixed to the vessel 12 is referred to as a forward direction (an arrow A direction), and a direction opposite to the direction in which the outboard motor 10 is fixed to the vessel 12 is referred to as a rearward direction (an arrow B direction).

The casing 14 has a hollow shape and extends along the up-down direction (directions of arrows C1 and C2). A drive shaft 20 (see FIG. 2) is housed inside the casing 14 along the up-down direction.

An upper end of the casing 14 is connected to a lower cover 36 of the engine cover 16 described below. The upper end of the casing 14 is provided with a mounting portion 22. The clamping mechanism 18 is detachably mounted to the mounting portion 22. The mounting portion 22 is recessed relative to other portions of the casing 14.

A gear case 24 is connected to a lower end of the casing 14. A transmission mechanism 26 and a propeller mechanism 28 are housed inside the gear case 24. The transmission mechanism 26 changes the rotational output of an engine 38 in accordance with the operation of a shift mechanism (not shown). The transmission mechanism 26 is connected to a lower end of the drive shaft 20 inside the gear case 24.

The propeller mechanism 28 includes a propeller shaft 30 (see FIG. 2) and a screw 32. The propeller shaft 30 extends along the front-rear direction. A front end of the propeller shaft 30 is connected to the transmission mechanism 26. The screw 32 is connected to a rear end of the propeller shaft 30. The screw 32 is disposed outside the gear case 24 and behind the gear case 24 (in the arrow B direction). The screw 32 is connected to the transmission mechanism 26 via the propeller shaft 30.

The driving force of the engine 38 is transmitted to the screw 32 via the drive shaft 20, the transmission mechanism 26, and the propeller shaft 30. When the vessel 12 is floated on a water surface 122 such as that of the lakes and marshes, the screw 32 is immersed below the water surface 122. The screw 32 rotates clockwise or counterclockwise about the propeller shaft 30. The vessel 12 moves forward or backward along with the rotation of the screw 32.

The engine cover 16 includes an upper cover 34 and the lower cover 36. The upper cover 34 and the lower cover 36 can be separated in the up-down direction (the directions of arrows C1 and C2). The engine cover 16 is coupled to the upper end of the casing 14. A housing chamber (not shown) is provided inside the engine cover 16. The engine 38 and a control device (not shown) are housed in the housing chamber. The engine 38 is fixed to a frame (not shown) in the housing chamber.

Each of the upper cover 34 and the lower cover 36 has an elliptical shape that is elongated in the front-rear direction (directions of arrows A and B) when the engine cover 16 is viewed in the up-down direction.

The upper cover 34 covers an upper portion of the engine 38. A lower end of the upper cover 34 is provided with an elliptical first peripheral edge portion 40. The first peripheral edge portion 40 opens downward. The first peripheral edge portion 40 has a constant height in the up-down direction of the upper cover 34. The first peripheral edge portion 40 can be brought into contact with a second peripheral edge portion 94 of the lower cover 36 described later.

The upper cover 34 has a bottomed shape that gradually extends inward from the first peripheral edge portion 40 toward the upper side (in the arrow C1 direction). In other words, the cross-sectional shape of the upper cover 34 is an arc shape that is curved convexly upward (in the arrow C1 direction).

The upper cover 34 is a molded product molded from a resin material. A mold for molding the upper cover 34 can be split in the width direction (an arrow D direction) orthogonal to the front-rear direction, with respect to the upper cover 34. When the upper cover 34 is molded, melted resin flows inside the mold arranged on one side in the width direction. When the upper cover 34 is molded, melted resin flows inside the mold arranged on the other side in the width direction. The melted resin on the one side and the melted resin on the other side are joined to each other at a mating portion where the two molds are in contact with each other in the width direction. As a result, the upper cover 34 is molded by the mold that can be split in the width direction. The center of the upper cover 34 in the width direction is a joint portion 66 (see FIG. 5) where the melted resins from the two molds are joined to each other.

A pair of claw portions 42 (see FIG. 2) are provided at the front end of the upper cover 34. The claw portions 42 protrude forward (in the arrow A direction) from the front end of the upper cover 34. The pair of claw portions 42 are separated from each other in the width direction (the arrow D direction) orthogonal to the front-rear direction of the upper cover 34 (the directions of arrows A and B). The claw portions 42 are disposed on the first peripheral edge portion 40. The claw portions 42 are engaged with insertion holes (not shown) at the front end of the lower cover 36.

As shown in FIGS. 1 to 6, the rear end of the upper cover 34 is provided with an intake port 44 and a belt holding portion 46.

The intake port 44 opens above the first peripheral edge portion 40 (in the arrow C1 direction). The intake port 44 has a substantially rectangular shape when viewed from the rear of the upper cover 34. The intake port 44 penetrates the upper cover 34 along the front-rear direction of the engine cover 16 (the directions of arrows A and B). The outside of the upper cover 34 and the storage chamber (not shown) communicate with each other through the intake port 44. Air outside the upper cover 34 is taken into the storage chamber through the intake port 44, and the air is supplied to the engine 38.

The belt holding portion 46 is disposed below the intake port 44 (in the arrow C2 direction). The belt holding portion 46 is disposed inside the upper cover 34. A fixing belt 48 capable of fixing the upper cover 34 and the lower cover 36 is attached to the belt holding portion 46.

As shown in FIGS. 3 to 6, the belt holding portion 46 is disposed on an inner surface 341 located at the center of the upper cover 34 in the width direction. The belt holding portion 46 is disposed in the vicinity of the first peripheral edge portion 40. The belt holding portion 46 is disposed above the first peripheral edge portion 40 (in the arrow C1 direction). The belt holding portion 46 protrudes forward (in the arrow A direction) from the inner surface 341 of the upper cover 34. The belt holding portion 46 has a predetermined width in the width direction (the arrow D direction) orthogonal to the front-rear direction of the upper cover 34.

The belt holding portion 46 includes a projecting wall 50, a base wall 52, and a holding frame 54.

The projecting wall 50 extends inward (forward, in the arrow A direction) substantially perpendicularly to the inner surface 341 of the upper cover 34. An upper surface of the projecting wall 50 is inclined downward in a direction away from the inner surface 341. A lower surface of the projecting wall 50 is substantially horizontal along the front-rear direction.

The base wall 52 is connected to a substantially central portion of the projecting wall 50 in the extending direction thereof. The base wall 52 extends downward (in the arrow C2 direction) from the projecting wall 50 by a predetermined distance. The base wall 52 extends linearly along the up-down direction (the directions of arrows C1 and C2). A lower end of the base wall 52 is disposed below the first peripheral edge portion 40 (in the arrow C2 direction). That is, the base wall 52 protrudes further downward (in the arrow C2 direction) than the first peripheral edge portion 40. The base wall 52 is contactable with an inner peripheral wall 96 of the lower cover 36 to be described later.

The holding frame 54 is disposed at substantially the center of the base wall 52 in the extending direction thereof (the directions of arrows C1 and C2). The holding frame 54 is disposed forward of the base wall 52 (in the arrow A direction).

The holding frame 54 protrudes from the base wall 52 orthogonally to the base wall 52. The holding frame 54 includes a pair of first frame portions 561 and 562, and a second frame portion 58.

Each of the first frame portions 561 and 562 protrudes forward (inward, in the arrow A direction) from the base wall 52. The first frame portions 561 and 562 are separated from each other by a predetermined distance in the width direction of the upper cover 34 (the arrow D direction) (see FIGS. 5 and 6). Each of the first frame portions 561 and 562 has a substantially rectangular cross-sectional shape. An upper surface 60 of each of the first frame portions 561 and 562 is flat. The upper surface 60 of each of the first frame portions 561 and 562 extends along the front-rear direction (the directions of arrows A and B) and the width direction (the arrow D direction) of the upper cover 34. The upper surface 60 of the first frame portion 561 and the upper surface 60 of the first frame portion 562 are substantially flush in the up-down direction of the upper cover 34 (the directions of arrows C1 and C2).

The second frame portion 58 extends along the width direction of the upper cover 34 (the arrow D direction). The second frame portion 58 is spaced forward (in the arrow A direction) from the base wall 52 by a predetermined distance. The second frame portion 58 is substantially parallel to the base wall 52. One end of the second frame portion 58 in the width direction is connected to an inner end of the first frame portion 561. The other end of the second frame portion 58 in the width direction is connected to an inner end of the first frame portion 562. The second frame portion 58 is connected substantially at right angles to each of the first frame portions 561 and 562. That is, the holding frame 54 has a substantially U-shape when viewed in the up-down direction of the upper cover 34. An open end of the holding frame 54 is connected to the base wall 52. An upper surface 62 of the second frame portion 58 is flush with the upper surfaces 60 of the first frame portions 561 and 562 (see FIG. 5).

The holding frame 54 includes a belt insertion hole 64 surrounded by the first frame portions 561 and 562 and the second frame portion 58. The belt insertion hole 64 has a rectangular shape that is wide in the width direction of the holding frame 54 (the arrow D direction). The belt insertion hole 64 penetrates the holding frame 54 in the up-down direction (the directions of arrows C1 and C2). A part of the fixing belt 48 described later is inserted into the belt insertion hole 64.

A central portion of the second frame portion 58 in the width direction has the joint portion 66. When the upper cover 34 is molded from a resin material, the melted resin flowing inside the mold on the one side in the width direction and the melted resin flowing inside the mold on the other side in the width direction are joined to each other. The portion where the melted resins are joined to each other is the joint portion 66.

Specifically, after the first frame portions 561 and 562 are molded by the melted resins flowing inside the two molds, the melted resins pass through the first frame portions 561 and 562 and are merged and joined to each other at the center of the second frame portion 58 in the width direction. Therefore, in the belt holding portion 46, the strength of the first frame portions 561 and 562 is greater than the strength of the second frame portion 58. In other words, since the second frame portion 58 has the joint portion 66, the strength of the second frame portion 58 is lower than the strength of the first frame portions 561 and 562.

The fixing belt 48 is formed of an elastic material such as rubber. As shown in FIGS. 3 to 8, the fixing belt 48 includes a head portion 68, a belt portion 70, and a grip portion 72. The fixing belt 48 is attached to the belt holding portion 46 inside the upper cover 34. The belt portion 70 of the fixing belt 48 is inserted into the belt insertion hole 64 from above.

The head portion 68 is disposed at one end of the fixing belt 48 in the longitudinal direction thereof. The head portion 68 has a rectangular shape that is elongated in the width direction (the arrow D direction) orthogonal to the longitudinal direction of the fixing belt 48. The head portion 68 has a predetermined thickness in a thickness direction (the directions of arrows A and B in FIG. 3) orthogonal to the longitudinal direction.

The head portion 68 includes a first recess 74 and a second recess (recess) 76. When the fixing belt 48 is attached to the belt holding portion 46, the first recess 74 faces the inner surface 341 of the upper cover 34 disposed on the rear side. The first recess 74 is recessed forward (in the arrow A direction) by a predetermined depth in the thickness direction of the head portion 68. A distal end (inner end) of the projecting wall 50 is inserted into the first recess 74. That is, when the fixing belt 48 is attached to the belt holding portion 46, the first recess 74 functions as a clearance capable of avoiding contact with the distal end of the projecting wall 50.

An upper surface 741 of the first recess 74 is gradually inclined upward (in the arrow C1 direction) toward the inner surface 341 of the upper cover 34. A lower surface of the first recess 74 is gradually inclined downward (in the arrow C2 direction) toward the inner surface 341 of the upper cover 34. That is, the first recess 74 gradually expands in the up-down direction toward the inner surface 341 of the upper cover 34 (toward the rear side, in the arrow B direction).

The second recess 76 is disposed on the front side of the head portion 68 (in the arrow A direction), which is on the side opposite to the first recess 74. The second recess 76 is recessed rearward (in the arrow B direction) by a predetermined depth in the thickness direction of the head portion 68. An upper surface 761 of the second recess 76 is gradually inclined upward (in the arrow C1 direction) toward the front. When the fixing belt 48 is attached to the belt holding portion 46, the second recess 76 is disposed at a position facing the second frame portion 58. When the fixing belt 48 is attached to the belt holding portion 46, the head portion 68 and the upper surface 62 of the second frame portion 58 are separated from each other by the second recess 76. The second frame portion 58 and the second recess 76 are not in contact with each other (see FIGS. 3 and 4). In other words, the second recess 76 of the head portion 68 functions as a clearance for avoiding contact with the second frame portion 58.

The head portion 68 includes a pair of contact portions 781 and 782. The pair of contact portions 781 and 782 are respectively disposed at both ends of the head portion 68 in the width direction thereof. Lower surfaces of the contact portions 781 and 782 are flat surfaces orthogonal to the longitudinal direction of the fixing belt 48. The contact portion 781 and the contact portion 782 are located at the same height position in the longitudinal direction of the fixing belt 48. When the fixing belt 48 is attached to the belt holding portion 46, the contact portions 781 and 782 are held in contact with the upper surfaces 60 of the first frame portions 561 and 562, respectively. The lower surfaces of the contact portions 781 and 782 are in surface contact with the upper surfaces 60 of the first frame portions 561 and 562, respectively.

The belt portion 70 is connected to a lower end of the head portion 68. The belt portion 70 extends in a direction away from the head portion 68 with a substantially constant width W (see FIG. 8). The width W of the belt portion 70 is smaller than the width of the head portion 68. The center of the belt portion 70 in the width direction is aligned with the center of the head portion 68 in the width direction. The thickness of the belt portion 70 in the front-rear direction of the outboard motor 10 (the directions of arrows A and B) is smaller than the thickness of the head portion 68. The center of thickness of the belt portion 70 is aligned with the center of thickness of the head portion 68.

The belt portion 70 includes a pair of engagement holes 801 and 802. Each of the engagement holes 801 and 802 has, for example, a substantially rectangular shape. The pair of engagement holes 801 and 802 are arranged at a predetermined interval in the longitudinal direction of the belt portion 70. Each of the engagement holes 801 and 802 is disposed at the center in the width direction of the belt portion 70. The engagement holes 801 and 802 penetrate the belt portion 70 in the thickness direction. A locking portion 100 of the lower cover 36, which will be described later, can engage with the engagement holes 801 and 802.

An upper end of the belt portion 70 in the longitudinal direction is connected to the head portion 68. The vicinity of the upper end of the belt portion 70 includes an insertion portion 82. The insertion portion 82 is a portion that is inserted into the belt insertion hole 64 when the fixing belt 48 is attached to the belt holding portion 46.

Figure 8:
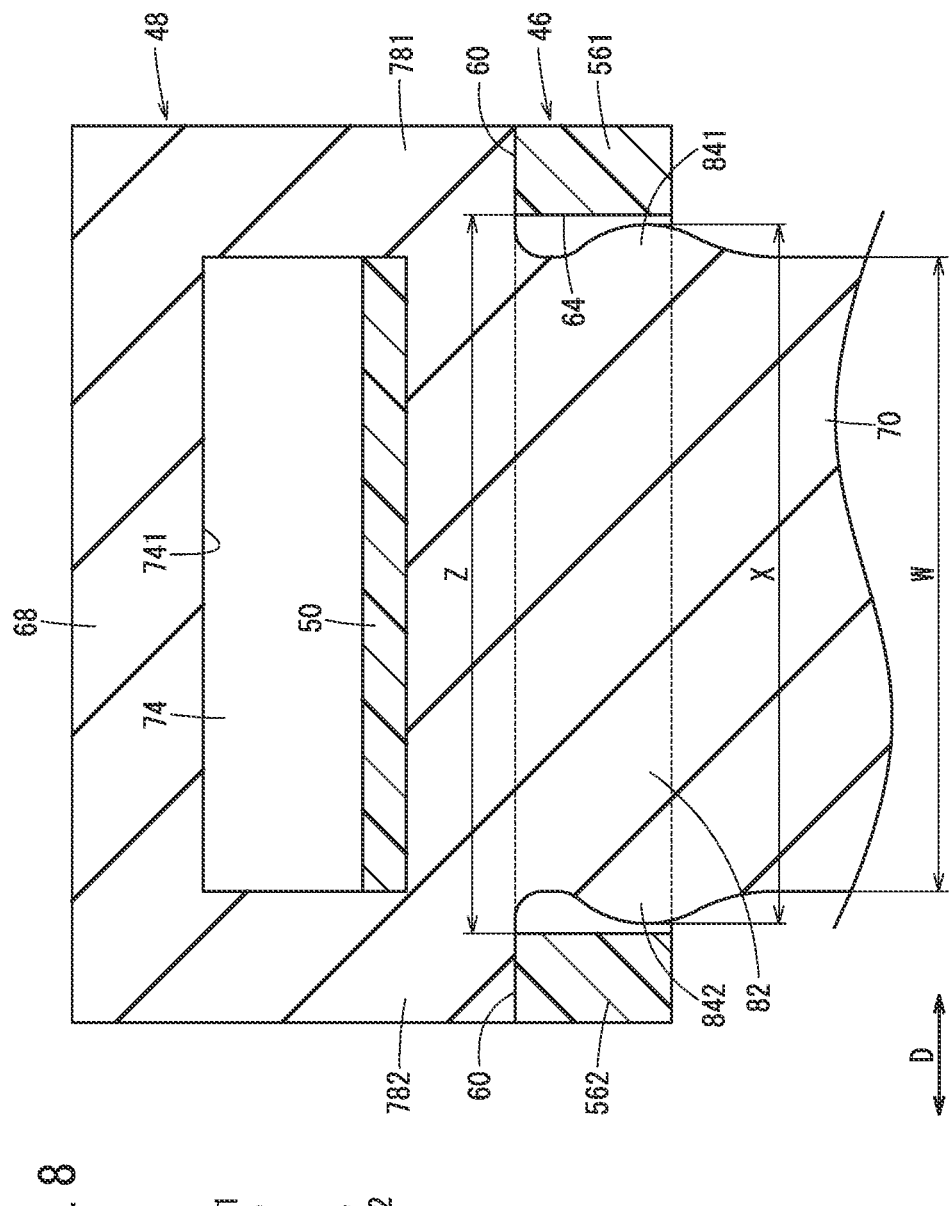
FIG. 8 is a cross-sectional view taken along line VIII-VIII of FIG. 4.

The insertion portion 82 of the belt portion 70 includes a pair of protrusions 841 and 842. Each of the protrusions 841 and 842 is disposed on a side portion of the belt portion 70 in the width direction thereof. Each of the protrusions 841 and 842 protrudes in a direction away from the belt portion 70 (insertion portion 82) (outward in the width direction). A cross-sectional shape of each of the protrusions 841 and 842 is an arc shape curved in a direction away from the belt portion 70. As shown in FIG. 8, a width X of the insertion portion 82 including the pair of protrusions 841 and 842 is greater than the width W of the belt portion 70 (W<X).

As shown in FIG. 8, the width (distance) X from the top of the protrusion 841 to the top of the protrusion 842 is smaller than a width Z of the belt insertion hole 64 (X<Z). Accordingly, when the insertion portion 82 is inserted into the belt insertion hole 64, a slight clearance is provided between each of the protrusions 841 and 842, and the inner surface 341 of the second frame portion 58.

Figure 5:
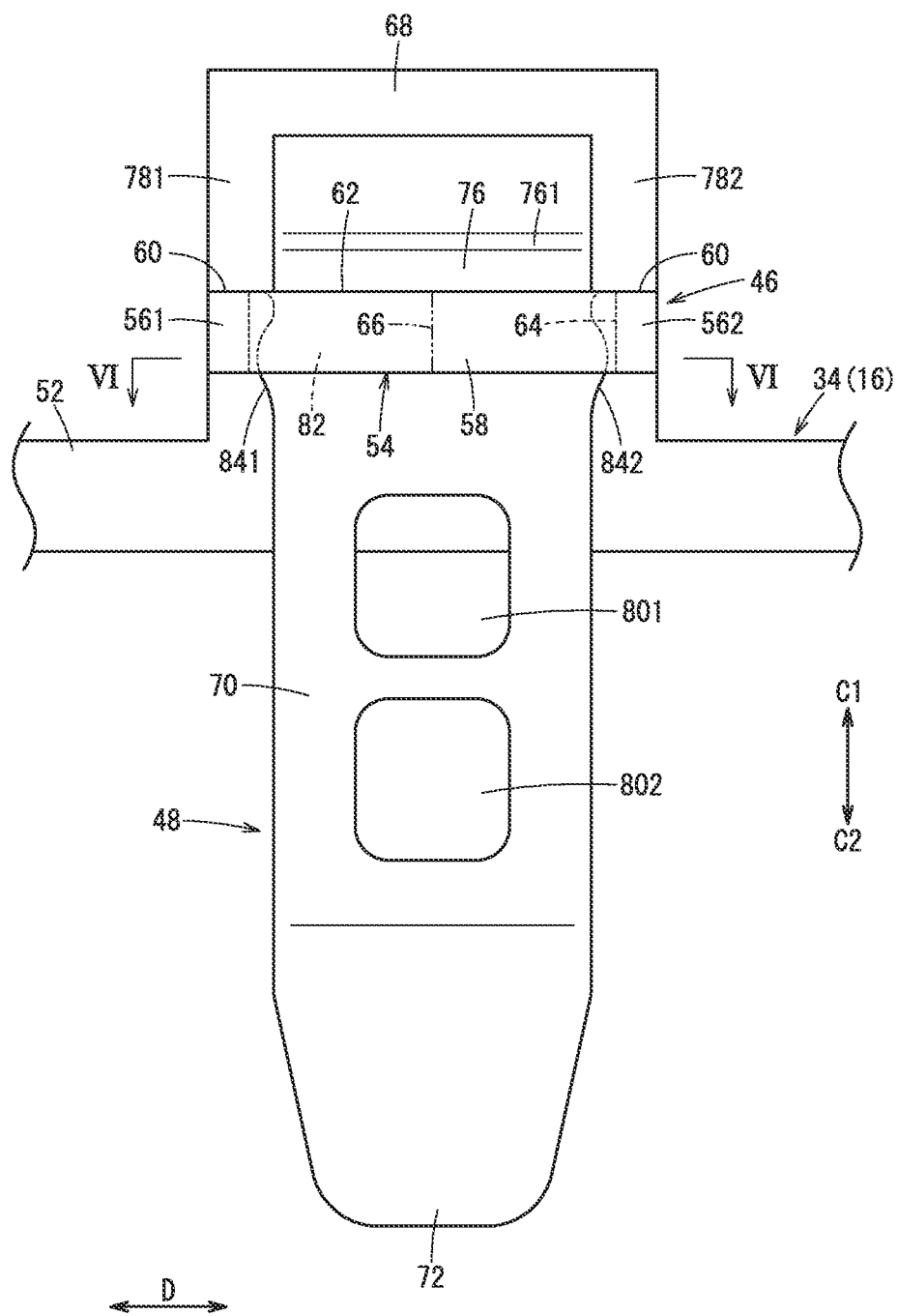
FIG. 5 is an enlarged front view of the vicinity of the fixing belt viewed from the inside of an engine cover.
Figure 6:
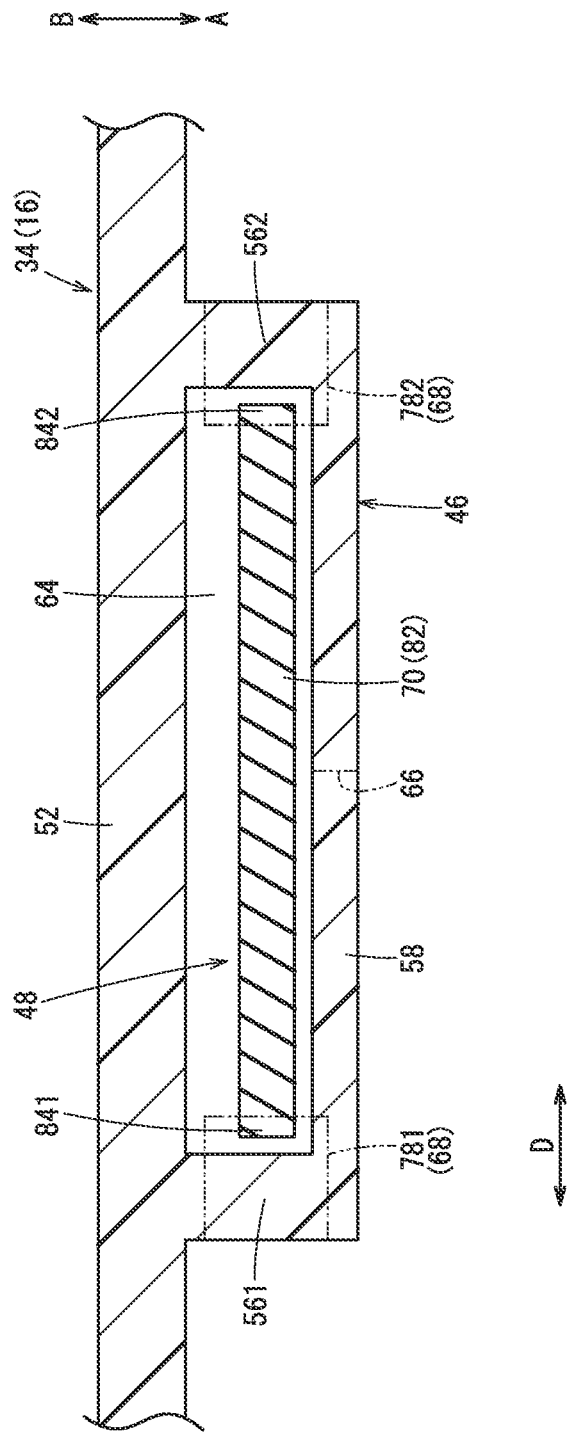
FIG. 6 is a cross-sectional view taken along line VI-VI of FIG. 5.
Figure 7:
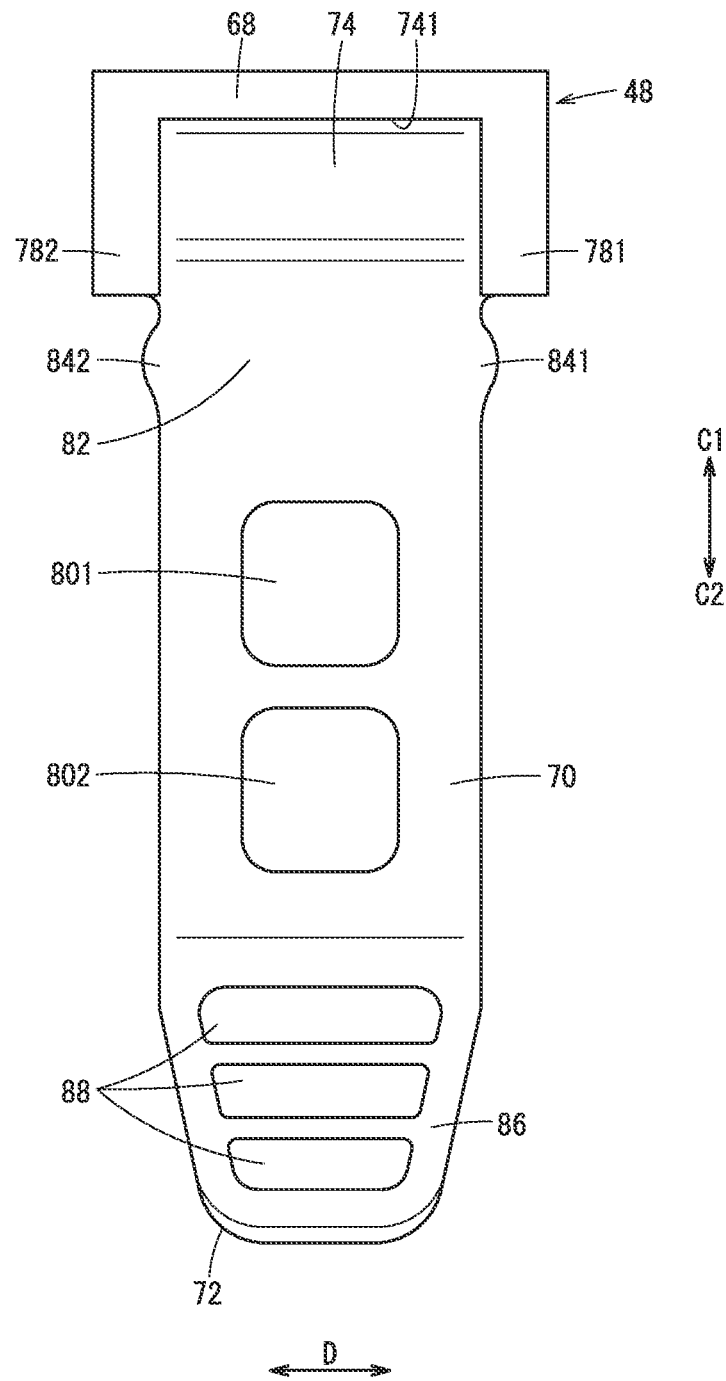
FIG. 7 is a front view of the fixing belt.

The grip portion 72 is connected to a lower end of the belt portion 70. The width of the grip portion 72 gradually decreases in a direction away from the belt portion 70 (downward, in the arrow C2 direction). As shown in FIGS. 5 and 7, the grip portion 72 has a substantially trapezoidal shape in which the lower end thereof is narrowest.

As shown in FIGS. 3 to 8, the grip portion 72 is bent in the thickness direction from the lower end of the belt portion 70. When the fixing belt 48 is attached to the belt holding portion 46, the grip portion 72 is inclined rearward (in the arrow B direction) from the belt portion 70 at a predetermined angle.

The grip portion 72 includes a gripping surface 86. When the fixing belt 48 is attached to the belt holding portion 46, the gripping surface 86 is located on the rear side (in the arrow B direction). The gripping surface 86 includes three grooves 88. Each of the grooves 88 is recessed in the thickness direction from the surface of the gripping surface 86. Each of the grooves 88 does not penetrate the grip portion 72. Each of the grooves 88 linearly extends along the width direction of the grip portion 72 (the arrow D direction). The three grooves 88 are arranged parallel to each other at predetermined intervals. The number of the grooves 88 is not limited to three. The grooves 88 may penetrate the grip portion 72 in the thickness direction.

The grip portion 72 is gripped by fingers of a vessel operator (not shown). At this time, the fingers gripping the grip portion 72 are prevented from slipping by the three grooves 88. Accordingly, the grip portion 72 is reliably gripped by the vessel operator. The vessel operator grips the grip portion 72 to attach or detach the fixing belt 48.

As shown in FIGS. 1 to 4, the lower cover 36 is disposed below the upper cover 34 (in the arrow C2 direction). The lower cover 36 includes a cover portion 90 and a connecting portion 92. Similarly to the upper cover 34, the lower cover 36 is a molded product molded from a resin material.

The cover portion 90 covers a lower portion of the engine 38. An upper end of the cover portion 90 includes a second peripheral edge portion 94. The second peripheral edge portion 94 opens upward. The second peripheral edge portion 94 has an elliptical shape when viewed in the up-down direction of the engine cover 16. The second peripheral edge portion 94 is formed with a constant height in the up-down direction of the lower cover 36. An upper surface 941 of the second peripheral edge portion 94 is flat. When the upper cover 34 and the lower cover 36 are assembled, the upper surface 941 of the second peripheral edge portion 94 can come into contact with a lower end of the first peripheral edge portion 40 of the upper cover 34.

The cover portion 90 has a bottomed shape that gradually extends inward from the second peripheral edge portion 94 toward the lower side (in the arrow C2 direction).

Figure 3:
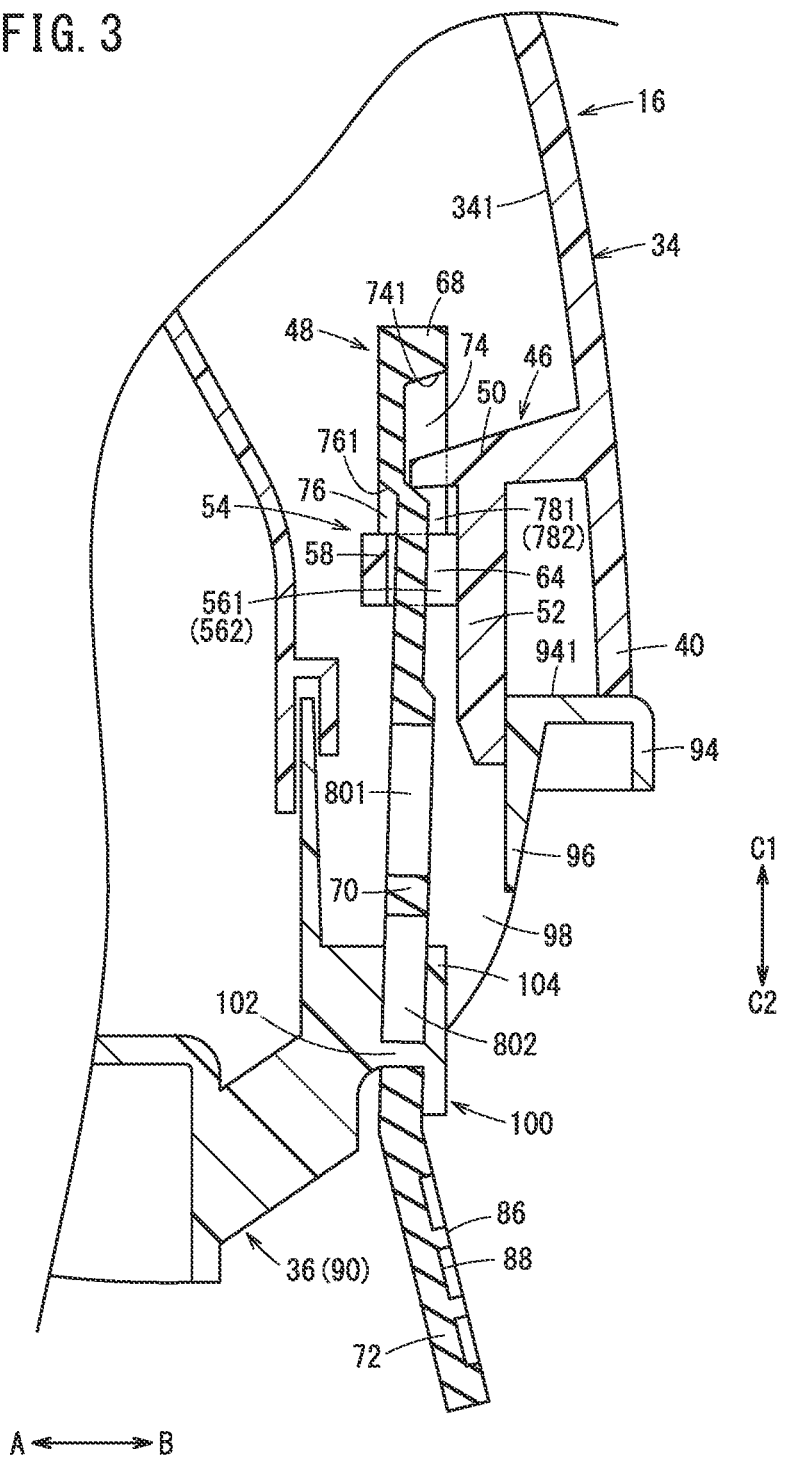
FIG. 3 is a cross-sectional view taken along line III-III of FIG. 1.
Figure 4:
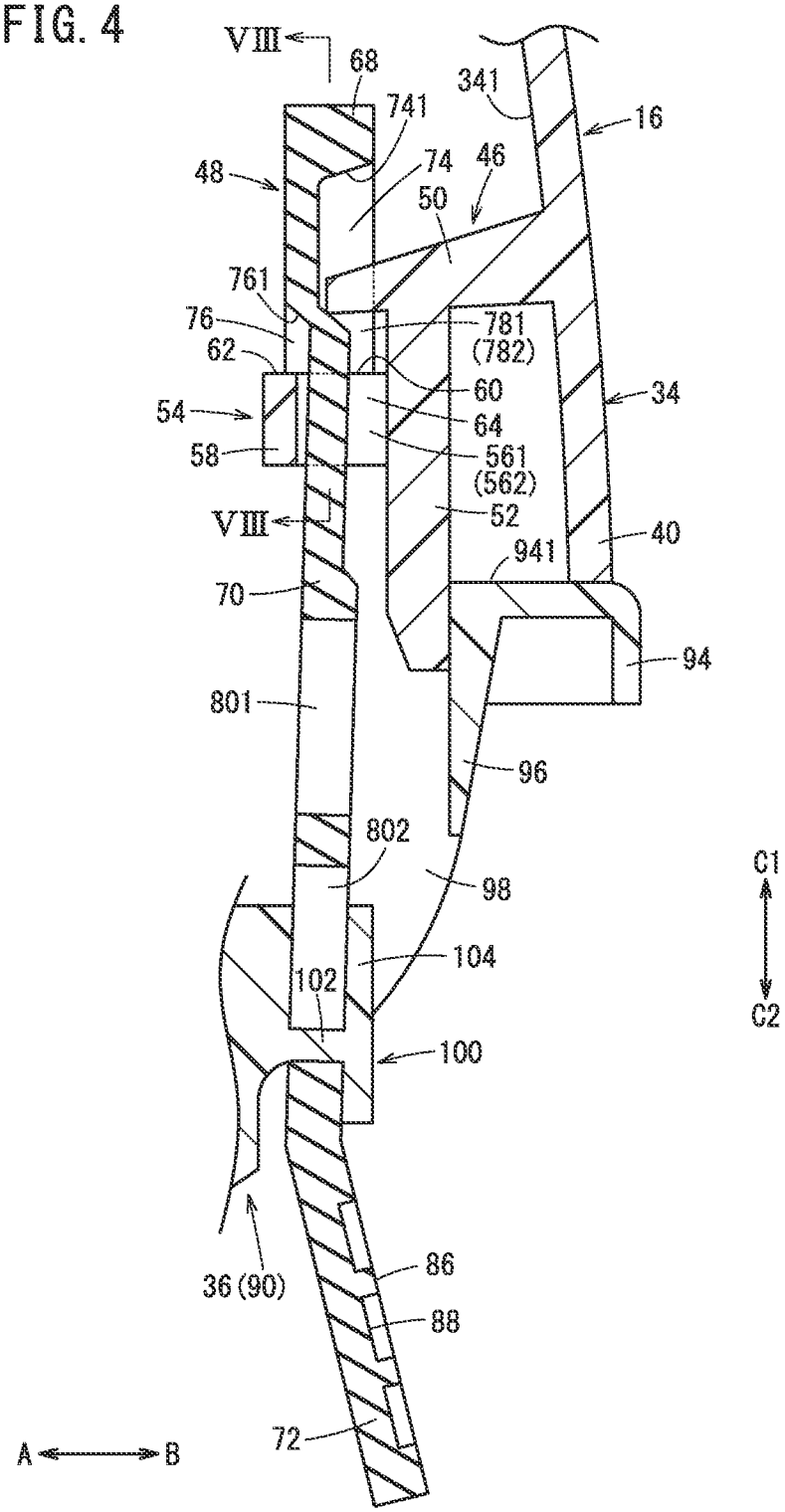
FIG. 4 is an enlarged cross-sectional view showing the vicinity of a fixing belt in FIG. 3.

As shown in FIGS. 3 and 4, the cover portion 90 includes an inner peripheral wall 96. The inner peripheral wall 96 is disposed on the inner side of the second peripheral edge portion 94. The inner peripheral wall 96 extends downward (in the arrow C2 direction) from an inner end of the upper surface 941 of the second peripheral edge portion 94.

When the upper cover 34 and the lower cover 36 are assembled, the lower end of the base wall 52 of the upper cover 34 comes into contact with the inner surface of the inner peripheral wall 96 on the front side. The inner peripheral wall 96 and the base wall 52 come into contact with each other while overlapping each other by a predetermined length in the up-down direction (the directions of arrows C1 and C2).

A front end of the cover portion 90 includes insertion holes (not shown). When the upper cover 34 and the lower cover 36 are assembled, the claw portions 42 of the upper cover 34 are engaged with the insertion holes. As a result, the front end of the upper cover 34 and the front end of the lower cover 36 are engaged with each other in a state in which the first peripheral edge portion 40 of the upper cover 34 and the second peripheral edge portion 94 of the lower cover 36 are in contact with each other. The front end of the upper cover 34 and the front end of the lower cover 36 are connected in the up-down direction by the claw portions 42.

A rear end of the cover portion 90 includes an opening 98 and the locking portion 100. When the upper cover 34 and the lower cover 36 are vertically assembled, the opening 98 and the locking portion 100 are aligned with the belt holding portion 46 in the up-down direction (the directions of arrows C1 and C2). When the upper cover 34 and the lower cover 36 are vertically assembled, the opening 98 and the locking portion 100 are aligned with the fixing belt 48 vertically.

The opening 98 opens toward the lower side of the cover portion 90 (in the arrow C2 direction). The opening 98 penetrates to the inner side of the inner peripheral wall 96. The fixing belt 48 can be inserted through the opening 98. The width of the opening 98 is substantially the same as or greater than the width of the fixing belt 48. The opening 98 has a rectangular shape that is elongated in the width direction (the arrow D direction) when the engine cover 16 is viewed from below. When the upper cover 34 and the lower cover 36 are assembled, the lower end of the base wall 52 of the belt holding portion 46 is inserted into the opening 98.

The locking portion 100 is disposed below the second peripheral edge portion 94 (in the arrow C2 direction). The locking portion 100 is disposed forward of the opening 98 (in the arrow A direction). The locking portion 100 includes a locking wall 102 and a plate portion 104.

The plate portion 104 has a plate shape and extends in the up-down direction (the directions of arrows C1 and C2). The plate portion 104 faces the opening 98. The plate portion 104 is disposed substantially parallel to the inner peripheral wall 96 of the cover portion 90. The plate portion 104 is spaced forward (in the arrow A direction) from the inner peripheral wall 96. A front surface of the plate portion 104 that is on the front side is connected to the locking wall 102. An end portion of the locking wall 102 is connected to a substantially central portion of the plate portion 104 in the up-down direction.

The height of the plate portion 104 in the up-down direction is substantially the same as or smaller than the height of the engagement holes 801 and 802 in the fixing belt 48.

The width of the plate portion 104 is substantially the same as or smaller than the width of the engagement holes 801 and 802 in the fixing belt 48. When the upper cover 34 and the lower cover 36 are vertically assembled, the plate portion 104 can be inserted into the engagement holes 801 and 802 of the fixing belt 48.

When the upper cover 34 and the lower cover 36 are vertically assembled, the belt portion 70 and the grip portion 72 of the fixing belt 48 are inserted through the opening 98. The plate portion 104 and the locking wall 102 of the locking portion 100 are inserted into the engagement hole 802 of the fixing belt 48 from the front toward the rear (in the arrow B direction). A lower end of the engagement hole 802 is engaged with the lower side of the locking wall 102. The head portion 68 of the fixing belt 48 is engaged with the belt holding portion 46 of the upper cover 34, and the belt portion 70 is engaged with the locking portion 100 of the lower cover 36. The two engagement holes 801 and 802 are selectively used according to the position of the locking portion 100 or the like.

As a result, the upper cover 34 and the lower cover 36 are vertically assembled, and the rear end of the upper cover 34 and the rear end of the lower cover 36 are vertically connected by the fixing belt 48. Thus, the engine cover 16 having a storage chamber therein is constituted by the upper cover 34 and the lower cover 36. The engine 38 and the control device are covered by the engine cover 16.

As shown in FIG. 2, a handle 106 is attached to a side surface of the lower cover 36 in the width direction. A proximal end of the handle 106 is rotatably fixed to a side surface of the cover portion 90 in the width direction. A throttle grip 108 is attached to a distal end of the handle 106. The throttle grip 108 has a tubular shape that can be gripped by the vessel operator and covers the distal end of the handle 106. The throttle grip 108 is rotatable on the outer periphery of the handle 106 in accordance with a rotation operation by the vessel operator. When the vessel operator rotates the throttle grip 108 in a predetermined direction, fuel control of the engine 38 is performed via a controller (not shown). As a result, the driving force output from the engine 38 to the screw 32 is controlled.

The vessel operator grips the distal end of the handle 106 and turns the distal end in the left-right direction along a horizontal plane substantially parallel to the water surface 122. As a result, the outboard motor 10 turns in the left-right direction at the stern 121 of the vessel 12 via a swing shaft (not shown). Thus, the traveling direction of the vessel 12 can be changed to the left-right direction.

The connecting portion 92 is connected to a lower end of the cover portion 90. The connecting portion 92 is disposed at substantially the center of the cover portion 90. The connecting portion 92 has a hollow tubular shape. The connecting portion 92 extends downward (in the arrow C2 direction) from the cover portion 90. The inside of the connecting portion 92 and the inside of the cover portion 90 communicate with each other.

The upper end of the casing 14 is connected to a lower end of the connecting portion 92. The inside of the connecting portion 92 and the inside of the casing 14 communicate with each other.

The clamping mechanism 18 is disposed forward of the casing 14 (in the arrow A direction) in the vicinity of the upper end of the casing 14. The clamping mechanism 18 includes a clamping member 110. The clamping member 110 has a substantially U-shape that opens downward (in the arrow C2 direction) when viewed in the width direction of the outboard motor 10 shown in FIG. 2. The clamping member 110 has a predetermined length in the front-rear direction. The vicinity of a front end 112 of the clamping member 110 that is on the front side is rotatably supported by a shaft 114 fixed to the upper end of the casing 14. A rear end 116 of the clamping member 110 extends downward by a predetermined length. The clamping member 110 is rotatable clockwise or counterclockwise via the shaft 114.

The rear end 116 of the clamping member 110 extends further downward than the front end 112. The rear end 116 of the clamping member 110 is spaced apart from and substantially parallel to the front end 112 in the front-rear direction.

The clamping member 110 includes a clamping groove 118 between the front end 112 and the rear end 116. The clamping groove 118 opens downward. The stern 121 of the vessel 12 is inserted into the clamping groove 118 from below.

A holder 120 is attached to a lower end of the rear end 116 of the clamping member 110. The holder 120 protrudes rearward (in the arrow B direction) from the rear end 116 of the clamping member 110. The holder 120 has a substantially U-shape with the rear side (the arrow B direction) opened when viewed in the direction in which the rear end 116 extends. When the casing 14 is rotated in a direction approaching the clamping member 110 (clockwise in FIG. 2), the holder 120 can be engaged with the mounting portion 22 of the casing 14. By the holder 120 being engaged with the mounting portion 22, the clamping member 110 is held at the upper end of the casing 14. At this time, each of the front end 112 and the rear end 116 of the clamping member 110 extends downward.

Figure 9:
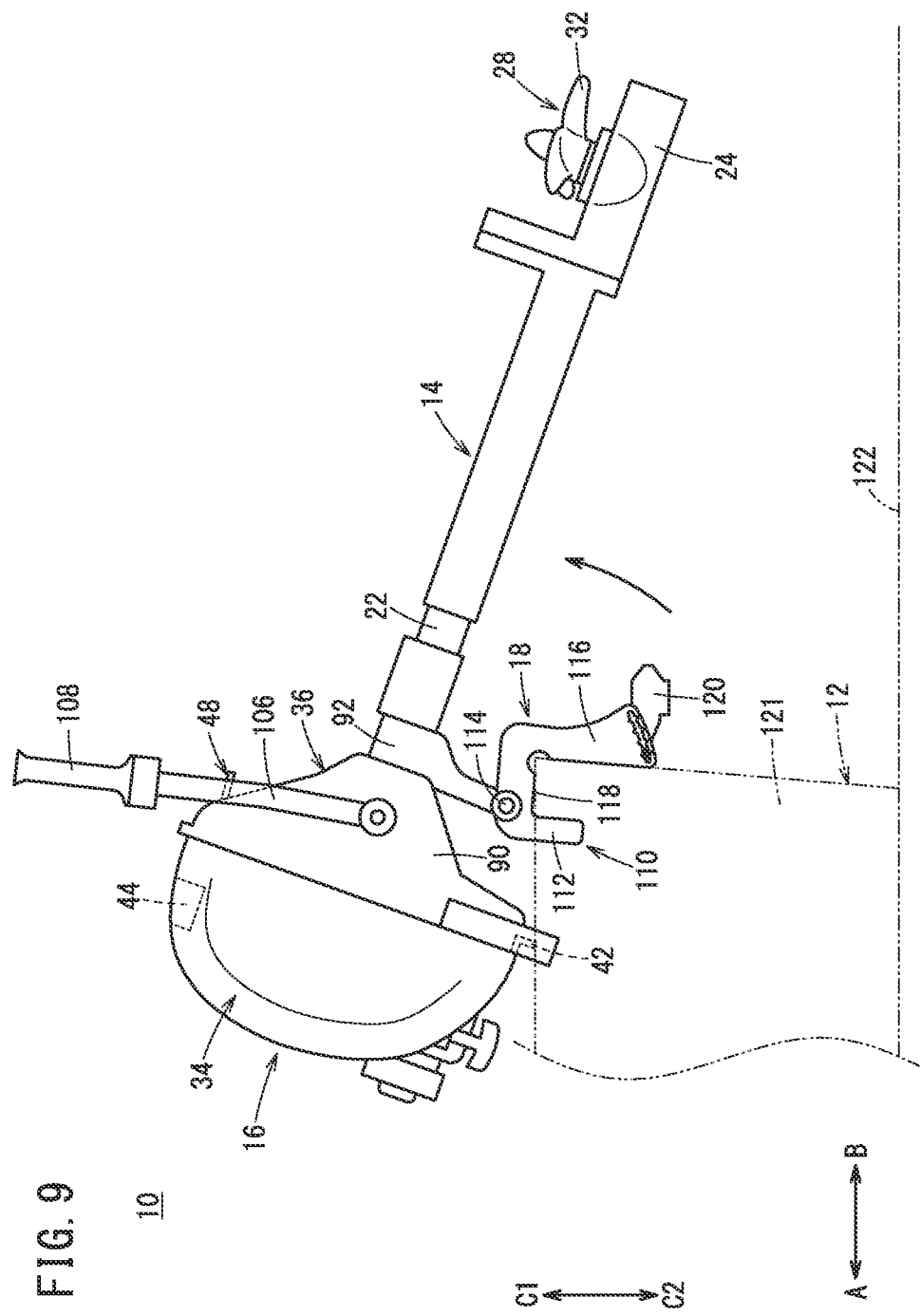
FIG. 9 is a side view showing a state in which the outboard motor of FIG. 2 is tilted up from the water surface.

As shown in FIG. 9, when the casing 14 is rotated in a direction away from the clamping member 110 (counterclockwise), the holder 120 can be detached from the mounting portion 22 of the casing 14. In other words, the holder 120 is attachable to and detachable from the mounting portion 22 of the casing 14.

The stern 121 of the vessel 12 is inserted, from below, between the front end 112 and the rear end 116 of the clamping member 110. The clamping member 110 holds the stern 121 of the vessel 12. As a result, as shown in FIG. 2, the outboard motor 10 is fixed to the center of the stern 121 of the vessel 12 by the clamping mechanism 18 including the clamping member 110.

The clamping mechanism 18 fixes the outboard motor 10 to the stern 121 of the vessel 12, and holds the outboard motor 10 at the stern 121 rotatably about the shaft 114.

Figure 10:
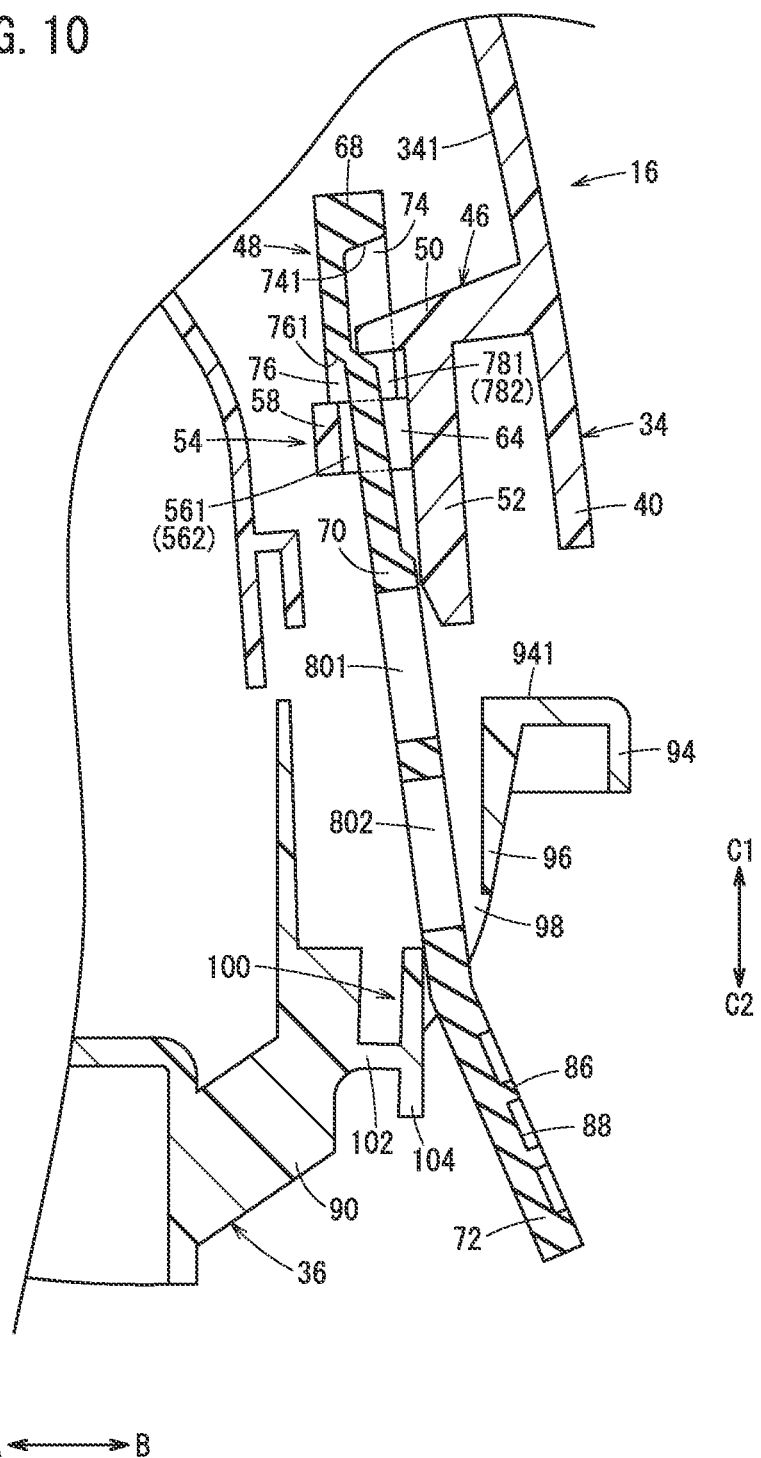
FIG. 10 is a cross-sectional view showing a state in which the engine cover is opened in the outboard motor of FIG. 4.

Next, a case where the engine cover 16 of the outboard motor 10 is closed and fixed by the fixing belt 48 will be described. FIG. 10 shows a state in which the fixing belt 48 is removed and the upper cover 34 is separated upward from the lower cover 36.

First, the rear end of the upper cover 34 is moved downward toward the lower cover 36 with the front end (the claw portions 42) of the upper cover 34 as a fulcrum. The first peripheral edge portion 40 of the upper cover 34 and the second peripheral edge portion 94 (the upper surface 941) of the lower cover 36 are brought into contact with each other. The grip portion 72 of the fixing belt 48 is inserted through the opening 98. It should be noted that the fixing belt 48 is always held by the belt holding portion 46 of the upper cover 34.

Then, the vessel operator grips the grip portion 72 of the fixing belt 48, pulls the fixing belt 48 downward, and thereafter, moves the belt portion 70 forward beyond the plate portion 104 via the engagement hole 802. The lower end of the engagement hole 802 is engaged with a lower portion of the locking wall 102, whereby the belt portion 70 is engaged with the locking wall 102 and the plate portion 104. Accordingly, the belt portion 70 of the fixing belt 48 is engaged with the locking portion 100, and the upper cover 34 and the lower cover 36 are fixed to each other in the up-down direction.

Next, the operation and effects of the outboard motor 10 will be described.

When the vessel 12 is operated in lakes and marshes, rivers, bays, oceans, or the like, the vessel 12 is floated on the water surface 122 of the lakes and marshes or the like. The screw 32 is immersed below the water surface 122 as shown in FIG. 2. The vessel operator boarding the vessel 12 drives the engine 38 of the outboard motor 10. The vessel operator grips the throttle grip 108 of the handle 106 of the outboard motor 10. The vessel operator rotates the throttle grip 108. With the rotation of the throttle grip 108, the driving force of the engine 38 is transmitted to the propeller shaft 30 via the drive shaft 20 and the transmission mechanism 26.

By the propeller shaft 30 being rotated by the driving force of the engine 38, the screw 32 is rotated. The rotation of the screw 32 generates a forward (the arrow A direction) or rearward (the arrow B direction) propulsive force on the vessel 12.

After the vessel 12 has been maneuvered as described above, until the vessel 12 and the outboard motor 10 will be used next time, tilt-up operation is performed to move the outboard motor 10 to above the water surface 122 as shown in FIG. 9. This tilt-up operation is performed, for example, for the purpose of avoiding contact of the outboard motor 10 with rocks, the bottom of the water, or the like when the vessel 12 is moored in shallow water or the like.

When tilting up the outboard motor 10, the vessel operator turns the handle 106 from the front to the rear of the engine cover 16 after confirming that the engine 38 is stopped.

Next, the vessel operator grips a front end lower portion and a rear end lower portion of the lower cover 36, and then lifts a rear end of the engine cover 16 upward. As a result, as shown in FIG. 9, the outboard motor 10 rotates counterclockwise about the shaft 114 of the clamping mechanism 18 held at the stern 121 of the vessel 12. At this time, the lower cover 36 and the upper cover 34 connected to each other by the fixing belt 48 integrally rotate counterclockwise.

Then, when the outboard motor 10 rotates rearward from the stern 121 of the vessel 12 and reaches a predetermined angle, the rotation of the outboard motor 10 is locked by a tilt lock mechanism (not shown), as shown in FIG. 9.

As a result, the outboard motor 10 is fixed at the stern 121 of the vessel 12 so as to be inclined rearward at a predetermined angle. That is, the tilt-up of the outboard motor 10 is completed. As shown in FIG. 9, the screw 32 of the outboard motor 10 is disposed at least above the water surface 122 (in the arrow C1 direction) by the tilt-up of the outboard motor 10.

When the above-described tilt-up operation of the outboard motor 10 is performed, for example, it is conceivable that the vessel operator accidentally puts his/her hand on the intake port 44 of the upper cover 34 and lifts the upper cover 34 upward.

When the rear end of the upper cover 34 is lifted upward due to the erroneous tilt-up operation, the fixing belt 48 is pulled upward together with the upper cover 34. The locking portion 100 of the lower cover 36 is in engagement with the belt portion 70 of the fixing belt 48. Therefore, as the fixing belt 48 is pulled upward, the weight of the casing 14 and the like including the lower cover 36 is applied to the belt portion 70 as a load. The direction of the load applied to the belt portion 70 is the gravity direction. This load is applied to the belt portion 70 and to the head portion 68, and is applied to the upper surfaces 60 of the first frame portions 561 and 562 of the belt holding portion 46 with which the contact portions 781 and 782 of the head portion 68 come into contact.

At this time, the first frame portions 561 and 562 of the belt holding portion 46 are disposed as a pair and separated from each other in the width direction of the upper cover 34. Therefore, the load applied from the fixing belt 48 to the belt holding portion 46 is suitably dispersed by the first frame portions 561 and 562. The second frame portion 58 of the upper cover 34 includes the joint portion 66 where the melted resins flowing through two molds are joined to each other. Therefore, the strength of the first frame portions 561 and 562 is greater than the strength of the second frame portion 58.

The head portion 68 of the fixing belt 48 is held by the pair of first frame portions 561 and 562 having great strength. Accordingly, the load applied from the fixing belt 48 can be reliably received by the first frame portions 561 and 562. As a result, the head portion 68 of the fixing belt 48 can be more reliably and firmly held by the belt holding portion 46.

The second frame portion 58 has a lower strength than the first frame portions 561 and 562. The second frame portion 58 is not in contact with the head portion 68 of the fixing belt 48 due to the second recess 76. Therefore, when a load is applied from the fixing belt 48 to the belt holding portion 46, the load is not applied to the second frame portion 58 from the head portion 68. Accordingly, the second frame portion 58 having a lower strength than the first frame portions 561 and 562 is prevented from being damaged by the load applied from the fixing belt 48.

Therefore, when the outboard motor 10 is tilted up, even if the vessel operator accidentally grips the rear end (the intake port 44) of the upper cover 34 and lifts the upper cover 34 upward, the belt holding portion 46 is reliably prevented from being damaged. Therefore, tilt-up of the outboard motor 10 can be reliably and safely performed.

As described above, in the embodiment of the present invention, the engine cover 16 of the outboard motor 10 includes the upper cover 34 and the lower cover 36 that are vertically separable. The fixing belt 48 capable of fixing the upper cover 34 and the lower cover 36 to each other is attached to the rear end of the engine cover 16. The upper cover 34 includes the belt holding portion 46 for holding the fixing belt 48. The belt holding portion 46 includes the base wall 52, and the holding frame 54 forming the belt insertion hole 64 between the base wall 52 and the holding frame 54. The holding frame 54 includes the pair of first frame portions 561 and 562 protruding from the base wall 52, and the second frame portion 58 separated from the base wall 52 and connecting the first frame portion 561 and the first frame portion 562.

The fixing belt 48 includes: the head portion 68 held by the belt holding portion 46 of the upper cover 34; and the belt portion 70 that extends from the head portion 68, is inserted through the belt insertion hole 64 of the belt holding portion 46 and extends downward, and is engaged with the locking portion 100 of the lower cover 36.

For example, when performing maintenance or the like of the engine 38 housed inside the engine cover 16, the vessel operator detaches and removes the belt portion 70 of the fixing belt 48 from the locking portion 100. As a result, the fixing belt 48 is held by the belt holding portion 46 of the upper cover 34, and the engagement between the fixing belt 48 and the lower cover 36 is released. As a result, the upper cover 34 and the lower cover 36 can be easily released from being fixed to each other.

After the upper cover 34 holding the fixing belt 48 and the lower cover 36 are brought into contact with each other, the belt portion 70 of the fixing belt 48 is engaged with the locking portion 100 of the lower cover 36. As a result, the upper cover 34 and the lower cover 36 can be easily fixed to each other by the fixing belt 48 to close the engine cover 16.

In the conventional outboard motor, an upper cover and a lower cover are fixed by operating a pair of lock mechanisms disposed at the front and rear of an engine cover. As compared with the conventional outboard motor, the upper cover 34 and the lower cover 36 can be fixed only by the fixing belt 48. Therefore, the structure of the outboard motor 10 can be simplified. Accordingly, it is possible to miniaturize the outboard motor 10 compared to the conventional outboard motor. Further, by simplifying the structure of the outboard motor 10, the manufacturing cost thereof can be reduced.

The holding frame 54 includes the pair of first frame portions 561 and 562 connected to the inner surface 341 of the upper cover 34 and separated from each other, and the second frame portion 58 connecting the first frame portion 561 and the first frame portion 562. The contact portions 781 and 782 of the fixing belt 48 come into contact with the upper surfaces 60 of the first frame portions 561 and 562. In the width direction of the fixing belt 48 orthogonal to the longitudinal direction of the fixing belt 48, the width of the head portion 68 is greater than the width of the belt portion 70.

When the outboard motor 10 is tilted up, the upper cover 34 may be lifted upward and a load may be applied from the head portion 68 of the fixing belt 48 to the belt holding portion 46. At this time, the load is applied from the contact portions 781 and 782 to the first frame portions 561 and 562. Therefore, the head portion 68 of the fixing belt 48 can be reliably held by the first frame portions 561 and 562 having a greater strength than the second frame portion 58. As a result, even when the upper cover 34 is lifted upward, the belt holding portion 46 is prevented from being damaged.

The head portion 68 includes the second recess 76 between the contact portion 781 and the contact portion 782. The second recess 76 faces the second frame portion 58 and is recessed in a direction away from the second frame portion 58. The upper surface 62 of the second frame portion 58 and the second recess 76 are not in contact with each other. Accordingly, when a load is applied from the head portion 68 of the fixing belt 48 to the holding frame 54, the load is not applied from the head portion 68 to the second frame portion 58. As a result, the second frame portion 58 having a lower strength than the first frame portions 561 and 562 is prevented from being damaged.

The upper surface 761 of the second recess 76 is inclined in a direction away from the second frame portion 58 (upward, the arrow C1 direction) toward the front. Thus, when the fixing belt 48 is pulled downward and elastically deformed, contact between the head portion 68 and the second frame portion 58 can be avoided.

The fixing belt 48 includes the pair of protrusions 841 and 842 protruding outward in the width direction of the belt portion 70 from both sides of the belt portion 70 in the width direction. The pair of protrusions 841 and 842 face the pair of first frame portions 561 and 562 inside the belt insertion hole 64.

The distance along the width direction from the top of the protrusion 841 to the top of the protrusion 842 is greater than the width of the belt portion 70 and smaller than the width of the belt insertion hole 64. Accordingly, when the insertion portion 82 of the belt portion 70 is inserted through the belt insertion hole 64, it is possible to secure a clearance between the inner wall of the belt insertion hole 64 and the protrusions 841 and 842.

As a result, it is possible to position the fixing belt 48 with high accuracy in the width direction of the belt holding portion 46 and bring the contact portions 781 and 782 into contact with the first frame portions 561 and 562. Accordingly, when a load is applied from the fixing belt 48 to the belt holding portion 46, the load can be dispersed and uniformly applied from the pair of contact portions 781 and 782 to the pair of first frame portions 561 and 562.

The belt portion 70 includes the engagement holes 801 and 802 with which the locking portion 100 is engaged. Accordingly, the engagement holes 801 and 802 of the belt portion 70 of the fixing belt 48 held by the upper cover 34 are engaged with the locking portion 100 of the lower cover 36, whereby the upper cover 34 and the lower cover 36 can be easily and reliably fixed to each other by the fixing belt 48.

The fixing belt 48 includes, at the distal end of the belt portion 70, the grip portion 72 that can be gripped. The grip portion 72 gradually narrows in a direction away from the belt portion 70. Accordingly, when the fixing belt 48 is inserted through the belt insertion hole 64 of the belt holding portion 46, the insertion operation of the fixing belt 48 is facilitated by inserting the fixing belt 48 from the grip portion 72 having a narrow width.

The gripping surface 86 of the grip portion 72 has the three grooves 88. As a result, when the vessel operator grips the grip portion 72 with fingers to attach the fixing belt 48 to the locking portion 100 or detach the fixing belt 48 from the locking portion 100, the fingers are prevented from slipping by the three grooves 88 recessed from the gripping surface 86. Therefore, even if water adheres to the hands and fingers of the vessel operator, it is possible to reliably grip the grip portion 72 to perform work.

The grip portion 72 is bent rearward, which is a direction away from the vessel 12, from the belt portion 70. As a result, when the vessel operator grips the grip portion 72 from the rear of the outboard motor 10 to attach the fixing belt 48 to the locking portion 100 or detach the fixing belt 48 from the locking portion 100, the vessel operator can easily and reliably grip the grip portion 72 protruding rearward.

The above-described embodiment is summarized as follows.

According to the above embodiment, provided is an outboard motor (10) rotatably mounted on a stern (121) of a vessel (12) via a clamping mechanism (18), the outboard motor (10) comprising: an engine cover (16) including an upper cover (34) and a lower cover (36) that are vertically separable, the engine cover housing therein an engine (38); and a screw (32) disposed so as to extend rearward and rotated by a driving force from the engine, wherein the upper cover and the lower cover are connected to each other in an up-down direction at a front end of the engine cover, a fixing belt (48) configured to fix the upper cover and the lower cover to each other is attached to a rear end of the engine cover, the upper cover includes a belt holding portion (46) configured to hold the fixing belt, the belt holding portion includes a base wall (52), and a holding frame (54) that forms a belt insertion hole (64) between the base wall and the holding frame, the holding frame includes a pair of first frame portions (561, 562) protruding from the base wall, and a second frame portion (58) spaced apart from the base wall and configured to connect the pair of first frame portions to each other, the fixing belt includes a head portion (68) held by the belt holding portion, and a belt portion (70) that extends from the head portion, is inserted through the belt insertion hole of the belt holding portion to extend downward, and is engaged with a locking portion (100) of the lower cover, and the head portion includes a pair of contact portions (781, 782) configured to come into contact with upper surfaces (60) of the pair of first frame portions of the holding frame.

A width of the head portion is greater than a width of the belt portion in a width direction orthogonal to a longitudinal direction of the fixing belt.

The head portion includes a recess (76) between one of the contact portions and another of the contact portions, the recess faces the second frame portion and is recessed in a direction away from the second frame portion, and the recess and an upper surface (62) of the second frame portion are not in contact with each other.

An upper surface (761) of the recess is inclined in a direction away from the second frame portion toward a front side of the upper surface.

The fixing belt includes a pair of protrusions (841, 842) protruding outward in a width direction of the belt portion from both sides of the belt portion in the width direction, and the pair of protrusions face the pair of first frame portions inside the belt insertion hole.

A distance along the width direction from a top of one of the protrusions to a top of another of the protrusions is greater than a width of the belt portion and smaller than a width of the belt insertion hole.

The belt portion includes an engagement hole (801, 802) with which the locking portion is engaged.

The fixing belt includes, at a distal end of the belt portion, a grip portion (72) configured to be gripped, and the grip portion gradually narrows in a direction away from the belt portion.

A surface (86) of the grip portion includes a plurality of dents (88).

The grip portion is bent from the belt portion in a direction away from the vessel.

The present invention is not limited to the above disclosure, and various modifications are possible without departing from the essence and gist of the present invention.

What is claimed is:

1. An outboard motor rotatably mounted on a stern of a vessel via a clamping mechanism, the outboard motor comprising:
   an engine cover including an upper cover and a lower cover that are vertically separable, the engine cover housing therein an engine; and
   a screw disposed so as to extend rearward and rotated by a driving force from the engine, wherein
   the upper cover and the lower cover are connected to each other in an up-down direction at a front end of the engine cover,
   a fixing belt configured to fix the upper cover and the lower cover to each other is attached to a rear end of the engine cover,
   the upper cover includes a belt holding portion configured to hold the fixing belt,
   the belt holding portion includes a base wall, and a holding frame that forms a belt insertion hole between the base wall and the holding frame,
   the holding frame includes a pair of first frame portions protruding from the base wall, and a second frame portion spaced apart from the base wall and configured to connect the pair of first frame portions to each other,
   the fixing belt includes a head portion held by the belt holding portion, and a belt portion that extends from the head portion, is inserted through the belt insertion hole of the belt holding portion to extend downward, and is engaged with a locking portion of the lower cover, and
   the head portion includes a pair of contact portions configured to come into contact with upper surfaces of the pair of first frame portions of the holding frame.

2. The outboard motor according to claim 1, wherein a width of the head portion is greater than a width of the belt portion in a width direction orthogonal to a longitudinal direction of the fixing belt.

3. The outboard motor according to claim 1, wherein the head portion includes a recess between one of the contact portions and another of the contact portions, the recess faces the second frame portion and is recessed in a direction away from the second frame portion, and the recess and an upper surface of the second frame portion are not in contact with each other.

4. The outboard motor according to claim 3, wherein an upper surface of the recess is inclined in a direction away from the second frame portion toward a front side of the upper surface.

5. The outboard motor according to claim 1, wherein the fixing belt includes a pair of protrusions protruding outward in a width direction of the belt portion from both sides of the belt portion in the width direction, and the pair of protrusions face the pair of first frame portions inside the belt insertion hole.

6. The outboard motor according to claim 5, wherein a distance along the width direction from a top of one of the protrusions to a top of another of the protrusions is greater than a width of the belt portion and smaller than a width of the belt insertion hole.

7. The outboard motor according to claim 1, wherein the belt portion includes an engagement hole with which the locking portion is engaged.

8. The outboard motor according to claim 1, wherein the fixing belt includes, at a distal end of the belt portion, a grip portion configured to be gripped, and the grip portion gradually narrows in a direction away from the belt portion.

9. The outboard motor according to claim 8, wherein a surface of the grip portion includes a plurality of dents.

10. The outboard motor according to claim 8, wherein the grip portion is bent from the belt portion in a direction away from the vessel.

* * * * *